Nov. 1, 1932.  G. E. STEIN  1,885,873
POTATO RICER
Filed April 28, 1931
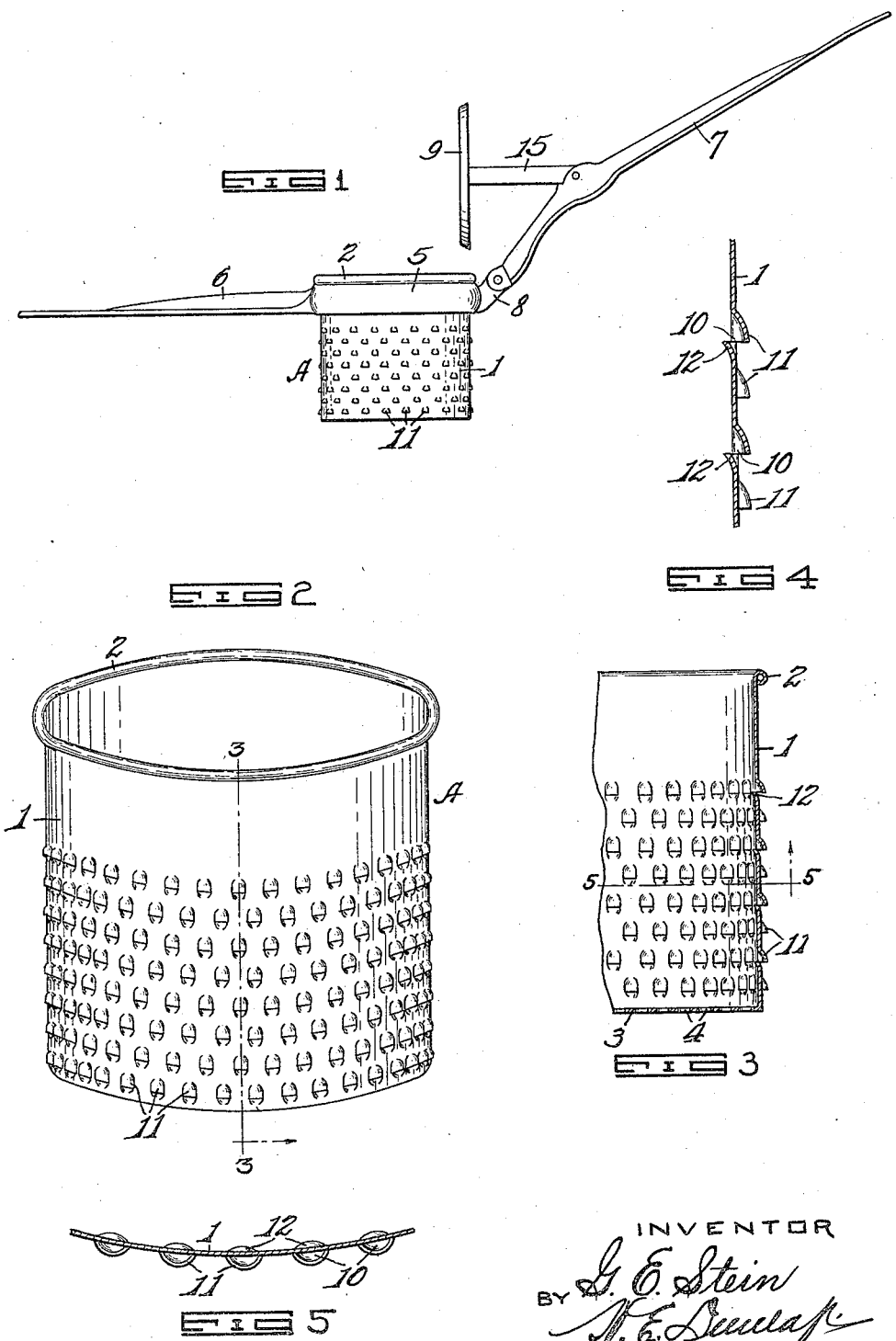

Patented Nov. 1, 1932

1,885,873

UNITED STATES PATENT OFFICE

GEORGE E. STEIN, OF MARIETTA, OHIO

POTATO RICER

Application filed April 28, 1931. Serial No. 533,442.

This invention relates broadly to culinary utensils, and more specifically to a potato ricer or similar extrusion device.

The primary object of the invention is to provide an improved form of ricer of a common commercial type embodying a perforated sheet metal receptacle, ordinarily termed a basket, through which boiled potatoes or other vegetables introduced therein may be extruded by lowering a plunger within the container under applied pressure.

Prior baskets of the type referred to have been formed with plain round holes or perforations stamped both in the bottoms and upright walls thereof. The material extruded through the perforations of said walls is forced outward at right angles to the line of force exerted by the descending plunger and, consequently, the applied force required to depress said plunger is considerable.

It is an object of the present invention to provide a basket having its walls provided with apertures through which the material is extruded in a downward direction, or substantially parallel to the line of applied force, instead of laterally outward at right angles, and which, consequently, permits operation of the plunger with the application to the latter of materially reduced force.

In describing the invention in detail, reference is had to the accompanying drawing, in which—

Figure 1 is a side elevation of a ricer constructed in accordance with my invention;

Figure 2 is an enlarged perspective view of the basket;

Figure 3 is a partial section on line 3—3, Fig. 2;

Figure 4 is an enlarged detail section of a fragmentary portion of the vertical wall of the basket; and—

Figure 5 is an enlarged detail section on line 5—5, Fig. 3.

Referring to said drawing, A designates generally the basket in which is deposited the material, as boiled potatoes, to be extruded for conversion into a finely crushed pulpy mass. Said basket consists of a cylindrical sheet metal body 1 having about its open upper end a suitable form of rim, as the bead or roll 2, and having fixed in the lower end thereof a bottom 3 provided with numerously suitably arranged perforations 4 through which some of the therein deposited material is extruded, as in prior structures of this general type.

The basket is removably mounted, as ordinarily, within the loose embrace of a supporting ring 5 rigidly carried upon an end of a handle 6. A lever 7 is pivotally mounted at one end upon a lug or lugs 8 fixed on said ring 5 at a point diametrically opposite said handle 6, and pivoted to said lever at an appropriate distance from the said pivoted end thereof is an end of a stem 15 which carries rigidly on its opposite end a disk shaped plunger 9. Said plunger is designed for introduction flatwise within the upper end of the basket and to be forcibly depressed, as ordinarily, for crushing the material introduced within the latter and for producing extrusion of said material, the lever 7 being manually forced downwardly and occupying approximate parallelism with said handle at the completion of the downward stroke of the plunger.

Provided in the basket body 1 are numerous extrusion openings or ports 10 of downwardly and outwardly inclined form as distinguished from the usual round-hole form of perforations hitherto universally employed in such baskets. In producing said ports, short horizontal slits are first cut in the metal of said body, following which the metal located immediately above each slit is pressed outwardly to occupy a downwardly and outwardly inclined position, thus forming a lip 11; or, if desired, a small area of the metal body located below each slit may also be thrust inwardly to form an upwardly and inwardly inclined lip 12. Where the lips 12 are employed, the same are preferably made to project from the plane of the body a materially less distance than the lips 11, as shown in Figs. 3, 4 and 5, thereby to interfere to a minimum extent with downward movement of the plunger 9. Furthermore, in order that such lips 12 may not unduly interfere with lowering movements of said plunger, the circumferential edge of the latter may have a downwardly and inwardly beveled form, as shown in Fig. 1.

It will be noted that the ports 10 constitute passages through which the material acted upon by the plunger is extruded in downwardly and outwardly inclined directions, in a direction more nearly parallel to the line of force exerted by the descending plunger than results from extrusion through the plain round holes heretofore employed in the basket body. Thus, theoretically, the force exerted in depressing the plunger may be less than is required to extrude the material at right angles to the line of force exerted by the plunger. Moreover, the extruded material may be deposited in a vessel of smaller area than is possible where round-hole perforations are employed in the basket body.

It will be understood that the lips 12 may be omitted, in which case the plunger may have its circumferential edge of the usual unbeveled form and will more closely be embraced by the vertical wall of the basket.

What is claimed is—

1. In a potato ricer, a sheet metal basket of cylindrical form having port-like apertures in its side wall, the metal of said wall above each port being outwardly pressed to form an outwardly and downwardly inclined concavo-convex lip, and the port being defined on its under side by an inwardly pressed upwardly and inwardly inclined lip.

2. In a potato ricer, a sheet metal basket of cylindrical form having port-like apertures in its side wall, the metal of said wall above each port being outwardly pressed to form an outwardly and downwardly inclined concavo-convex lip, the port being defined on its under side by an inwardly pressed upwardly and inwardly inclined lip, and a plunger for operation within said basket, said plunger having its circumferential edge beveled.

In testimony whereof, I affix my signature.

GEORGE E. STEIN.